US012774091B2

(12) United States Patent
Hoskote Hanumantha Rao

(10) Patent No.: US 12,774,091 B2
(45) Date of Patent: Oct. 27, 2026

(54) FULLY AUTOMATIC SIDE-LOCK SUBASSEMBLY

(71) Applicant: GOODRICH CORPORATION, Charlotte, NC (US)

(72) Inventor: Bhargav Hoskote Hanumantha Rao, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 607 days.

(21) Appl. No.: 18/324,003

(22) Filed: May 25, 2023

(65) Prior Publication Data

US 2024/0326998 A1 Oct. 3, 2024

(30) Foreign Application Priority Data

Mar. 28, 2023 (IN) ............................. 202341022696

(51) Int. Cl.

*B64D 9/00* (2006.01)
*B60P 7/08* (2006.01)
*B60P 7/13* (2006.01)
*B64C 1/20* (2006.01)

(Continued)

(52) U.S. Cl.

CPC ............ *B64D 9/003* (2013.01); *B60P 7/0815* (2013.01); *B60P 7/13* (2013.01); *B64C 1/20* (2013.01); *E05B 47/0012* (2013.01); *F16H 2057/0213* (2013.01)

(58) Field of Classification Search

CPC . E05B 47/0012; E05B 2047/16; B64D 9/003; B60P 7/0815; F16H 1/16; F16H 1/166; F16H 2057/0213; F16H 19/04; F16H 37/124; F16H 2061/2876;

(Continued)

(56) References Cited

U.S. PATENT DOCUMENTS 5,000,635 A * 3/1991 Jensen ...................... B60P 7/13 410/86
5,186,068 A * 2/1993 Heller ....................... F16H 1/16 74/401
8,408,861 B2 4/2013 Rawdon et al.

(Continued)

FOREIGN PATENT DOCUMENTS

CN 201273086 Y * 7/2009
CN 107975297 A * 5/2018 ........... E05B 47/026

(Continued)

OTHER PUBLICATIONS

European Patent Office, European Search Report dated Jan. 23, 2025 in Application No. 24165482.1.

(Continued)

*Primary Examiner* — Daniel J Colilla
(74) *Attorney, Agent, or Firm* — SNELL & WILMER L.L.P.

(57) ABSTRACT

A side-lock subassembly for use with a cargo system is disclosed herein. The side-lock subassembly includes a base defining a cavity and including an opening that extends through the base, a slider lock configured to extend out the opening of the base in a first direction, and a motor configured to move the slider lock in the first direction and in a second direction, the second direction being 180 degrees from the first direction, the motor disposed within the cavity.

10 Claims, 12 Drawing Sheets

(51) Int. Cl.
*E05B 47/00* (2006.01)
*F16H 57/021* (2012.01)

(58) Field of Classification Search
CPC .. F16H 2063/3066; F16H 55/26; F16H 55/22; B64C 1/20; B63B 25/24
See application file for complete search history.

(56) References Cited

U.S. PATENT DOCUMENTS

| | | | |
|---|---|---|---|
| 8,491,240 B2 | | 7/2013 | Baker |
| 9,452,901 B2 | | 9/2016 | Panzram et al. |
| 10,919,433 B1 | | 2/2021 | Lee et al. |
| 10,919,630 B1 | | 2/2021 | Lee et al. |
| 11,459,104 B2 | | 10/2022 | Harms et al. |
| 2014/0167574 A1 | * | 6/2014 | Shoenfeld ............ A47B 88/994 312/215 |
| 2017/0190277 A1 | | 7/2017 | Daniel |
| 2022/0363390 A1 | | 11/2022 | Mengual Hinojosa |
| 2023/0082864 A1 | | 3/2023 | Müller et al. |

FOREIGN PATENT DOCUMENTS

| | | | | | |
|---|---|---|---|---|---|
| CN | 211810192 | | | 10/2020 | |
| CN | 113148200 | | | 7/2021 | |
| CN | 113685089 | A | * | 11/2021 | ......... E05B 15/0013 |
| CN | 115680385 | A | * | 2/2023 | |
| DE | 102009040730 | | | 3/2015 | |
| DE | 102015113243 | B4 | * | 10/2023 | ......... G07C 9/00571 |
| FR | 2335676 | | | 7/1977 | |
| KR | 20120084251 | A | * | 7/2012 | ........... B63B 25/004 |

OTHER PUBLICATIONS

European Patent Office, European Partial Search Report dated Oct. 29, 2024 in Application No. 24165482.1.

Thang010146, "Gear rack drive for linear reciprocating motion 1", youtube video, dated Mar. 25, 2023 (Mar. 25, 2023), pp. 1-1, XP093178468, Retrieved from the Internet: URL: https://www.youtube.com/watch?v=euknuVhX_oQ, [retrieved on Jun. 24, 2024].

* cited by examiner

FULLY AUTOMATIC SIDE-LOCK SUBASSEMBLY

CROSS-REFERENCE TO RELATED APPLICATIONS

This application claims priority to, and the benefit of, India patent application Ser. No. 20/234,1022696 (DAS CODE: 5B5C), filed Mar. 28, 2023, and titled "FULLY AUTOMATIC SIDE-LOCK SUBASSEMBLY," which is incorporated by reference herein in its entirety for all purposes.

FIELD

The present disclosure generally relates cargo restraining assemblies, and more specifically to cargo side lock restraining assemblies.

BACKGROUND

Cargo lock assemblies are used in air cargo compartments of an aircraft for storing and securing cargo for transport. Cargo loaded into the aircraft may include unit load devices (ULDs) in the form of a container or pallet, among other standardized cargo. Generally, the cargo is secured in place within the cargo compartment along the sides and ends of the cargo. Cargo lock assemblies may provide restraint in a lateral direction of the aircraft and side lock assemblies may provide restraint in a vertical and a longitudinal direction of the aircraft.

SUMMARY

Disclosed herein is a side-lock subassembly, including a base defining a cavity and including an opening that extends through the base, a slider lock configured to extend out the opening of the base in a first direction, and a motor configured to move the slider lock in the first direction and in a second direction, the second direction being 180 degrees from the first direction, the motor disposed within the cavity.

In various embodiments, the side-lock subassembly further includes a worm coupled to the motor, a rack coupled to the slider lock, and a worm gear coupled to the base, the worm gear coupled to the worm and the rack and configured to translate a rotational motion of the worm to a linear motion of the slider lock. In various embodiments, the side-lock subassembly further includes a coupler shaft having a first end and a second end, the first end coupled to the motor and the second end coupled to the worm and a dowel pin extending through the worm gear and securing the worm gear to the base.

In various embodiments, the side-lock subassembly further includes an enclosure cap coupled to the base and enclosing the cavity, the enclosure cap including a second opening, wherein the second end of the coupler shaft extends through the second opening and a retainer ring configured to secure the second end of the coupler shaft to the enclosure cap. In various embodiments, the side-lock subassembly further includes a screw securing the rack to the slider lock. In various embodiments, the side-lock subassembly further includes a proximity sensor coupled to the base and pointing in the first direction. In various embodiments, the slider lock moves in the first direction in response to the motor turning in a clockwise direction and the slider lock moves in the second direction in response to the motor turning in a fourth direction.

Also disclosed herein is a cargo handling system, including a rail and a side-lock subassembly coupled to the rail. The side-lock subassembly includes a base defining a cavity and including an opening that extends through the base, a slider lock configured to extend out from the opening of the base in a first direction, and a motor configured to move the slider lock in the first direction and in a second direction that is 180 degrees opposite the first direction, the motor disposed within the cavity.

In various embodiments, the side-lock subassembly further includes a worm coupled to the motor, a rack coupled to the slider lock, and a worm gear coupled to the base, the worm gear coupled to the worm and the rack and configured to translate a rotational motion of the worm to a linear motion of the slider lock. In various embodiments, the side-lock subassembly further includes a coupler shaft having a first end and a second end, the first end coupled to the motor and the second end coupled to the worm, and a dowel pin extending through the worm gear and securing the worm gear to the base.

In various embodiments, the side-lock subassembly further includes an enclosure cap coupled to the base and enclosing the cavity, the enclosure cap including an opening, wherein the second end of the coupler shaft extends through the opening and a retainer ring configured to secure the second end of the coupler shaft to the enclosure cap. In various embodiments, the side-lock subassembly further includes a screw securing the rack to the slider lock. In various embodiments, the side-lock subassembly further includes a proximity sensor coupled to the base and pointing in the first direction. In various embodiments, the slider lock moves in the first direction in response to the motor turning in a clockwise direction and the slider lock moves in the second direction in response to the motor turning in a fourth direction.

Also disclosed herein is a system including a rail, a unit load device (ULD), a first side-lock subassembly including a first proximity sensor and a first slider lock, the first side-lock subassembly coupled to the rail, a second side-lock subassembly including a second proximity sensor and a second slider lock, the second side-lock subassembly coupled to the rail, a processor, and a memory operatively coupled to the processor. The memory including instructions stored thereon that, when executed by the processor, cause the processor to receive a first signal from the first proximity sensor, receive a second signal from the second proximity sensor, move the first slider lock to an extended position to engage the ULD, and move the second slider lock to the extended position to engage the ULD.

In various embodiments, the instructions, when executed by the processor, further cause the processor to determine that the ULD is in a loaded position, before moving the first slider lock and the second slider lock, in response to the first signal and the second signal indicating that ULD is within aligned with the first side-lock subassembly and the second side-lock subassembly. In various embodiments, the instructions, when executed by the processor, further cause the processor to receive a third signal from the first proximity sensor prior to receiving the first signal, the third signal indicating that the ULD is out of range of the first side-lock subassembly and move the first slider lock to a retracted position in response to the third signal.

In various embodiments, the instructions, when executed by the processor, further cause the processor to return the first slider lock to a retracted position before receiving the first signal and return the second slider lock to the retracted position before receiving the second signal. In various embodiments, the first side-lock subassembly further includes a motor, a worm coupled to the motor, a rack coupled to the first slider lock, and a worm gear coupled to the worm and the rack, the worm gear configured to translate a rotational motion of the worm to a linear motion of the rack and the first slider lock.

In various embodiments, the instructions, when executed by the processor, further cause the processor to check for obstacles in a path of the ULD and sound a warning in response to an obstacle being present.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
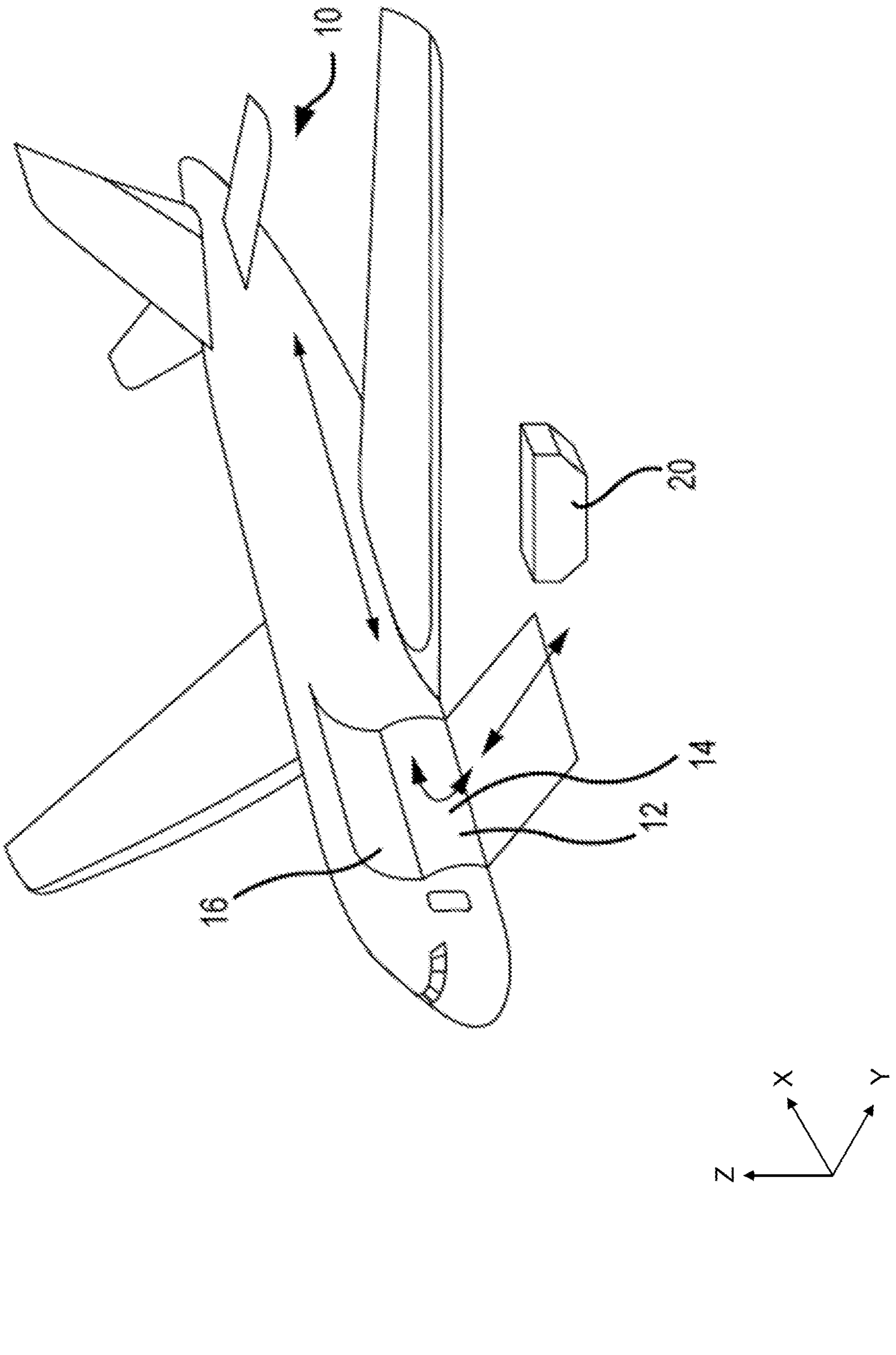
FIG. 1 illustrates a schematic of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a side-lock subassembly for use in aircraft cargo handling systems. In various embodiments, the cargo handling system may transport and secure cargo including unit load devices (ULDs) in the form of container or pallets, among others. The side-lock subassembly may be installed on a tray that is installed in the aircraft as part of the cargo handling system. In various embodiments, the side-lock subassembly may provide restraint for the cargo in a vertical direction and a longitudinal direction of the aircraft. In various embodiments, the side-lock subassembly includes a base that is coupled to the tray and a slider lock that is configured to extend and retract from the base to secure the cargo or allow the cargo to move.

In various embodiments, the side-lock subassembly further includes a motor, a coupler shaft, a worm, a worm gear, a rack, and a dowel pin. In various embodiments, the motor is coupled to the base and the worm is coupled to the motor by the coupler shaft. In various embodiments, the rack is coupled to the slider lock by a bolt. In various embodiments, the worm gear is coupled to the body by dowel pin. In various embodiments, the motor is configured to rotate the worm about an axis, the worm engages the worm gear, and the worm gear engages the rack to translate the rotational motion of the worm to linear motion of the rack and the slider lock. In various embodiments, the worm and the worm gear prevent movement of the slider lock when the motor is not engaged.

In various embodiments, the side-lock subassembly further includes a proximity sensor. In various embodiments, proximity sensor provides an indication that the cargo is in the stowed position and that the side-lock subassembly should engage the cargo to lock it in place. In various embodiments, the side-lock assembly may be controller individually. In various embodiments, the side-lock assembly may be controlled by a user. In various embodiments, the side-lock assembly may be controlled the cargo handling system without user intervention.

The side-lock subassembly as disclosed herein in its various embodiments, may reduce the amount of time, and therefore, the labor costs associated with storing, securing, and retrieving the cargo. In various embodiments, the side-lock subassembly includes fewer components that conventional side-lock subassemblies, resulting in lower costs. In various embodiments, the side-lock subassembly may allow for accurate position control within the cargo handling system.

Referring now to FIG. 1, a perspective view of an aircraft 10 is illustrated, in accordance with various embodiments. Aircraft 10 includes a cargo deck 12 located within a cargo compartment 14. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. A "ULD", as used herein, includes a container, pallet, or other cargo of any size, shape, configuration, and/or type. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift or the like. As illustrated, ULD 20 is loaded laterally (e.g., the negative y-direction) into cargo compartment 14. Once inside aircraft 10, ULD 20 may be moved longitudinally (e.g., the x-direction) cargo compartment 14 to a final stowed position. Straps, cargo locks, or side-lock subassemblies, among others, may be used to secure ULD 20 in the final stowed position to minimize, or prevent, movement of ULD 20 during transport. Multiple ULDs may be brought on-board aircraft 10, with each ULD 20 being placed in a respective stowed position on cargo deck 12. One or more final ULDs 20 may be loaded laterally into cargo compartment 14 but not moved longitudinally within cargo compartment 14. After aircraft 10 has reached its destination, each ULD 20 is unloaded from aircraft 10 in similar fashion, but in reverse sequence to the loading procedure. To facilitate movement of ULD 20 along the cargo deck 12, aircraft 10 may include a cargo handling system as described herein in accordance with various embodiments.

Figure 2B:
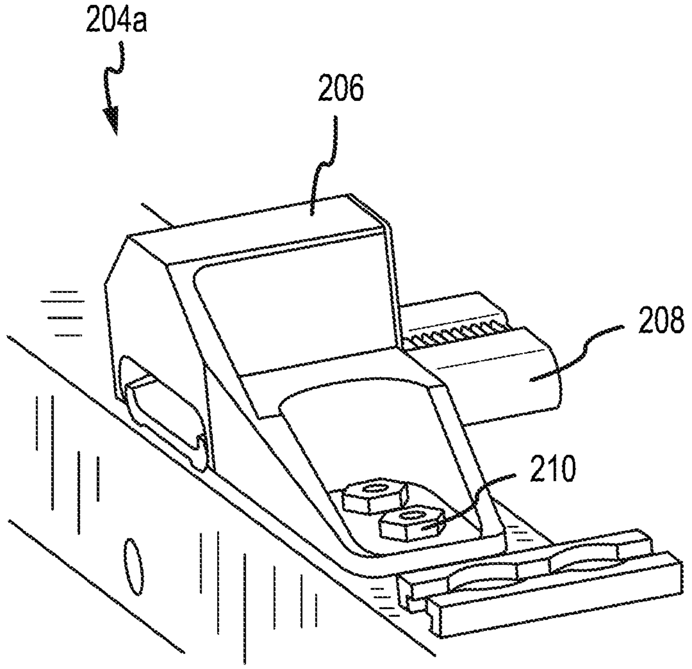
FIGS. 2A, 2B, 2C, and 2D illustrate a cargo handling system including side-lock subassemblies, in accordance with various embodiments.
Figure 2A:
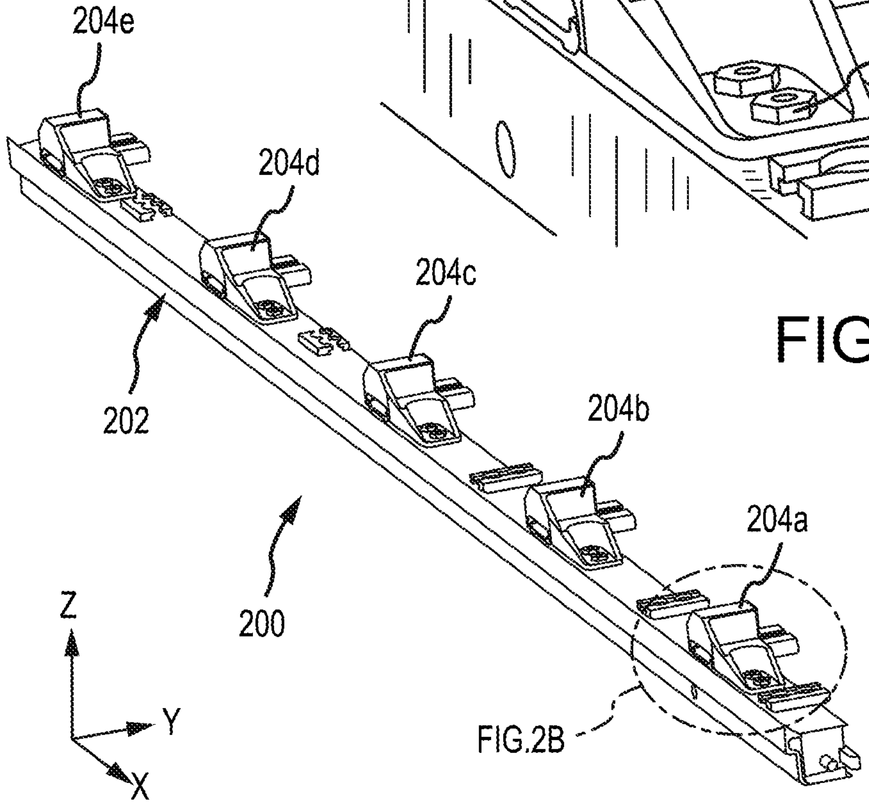
Figure 2D:
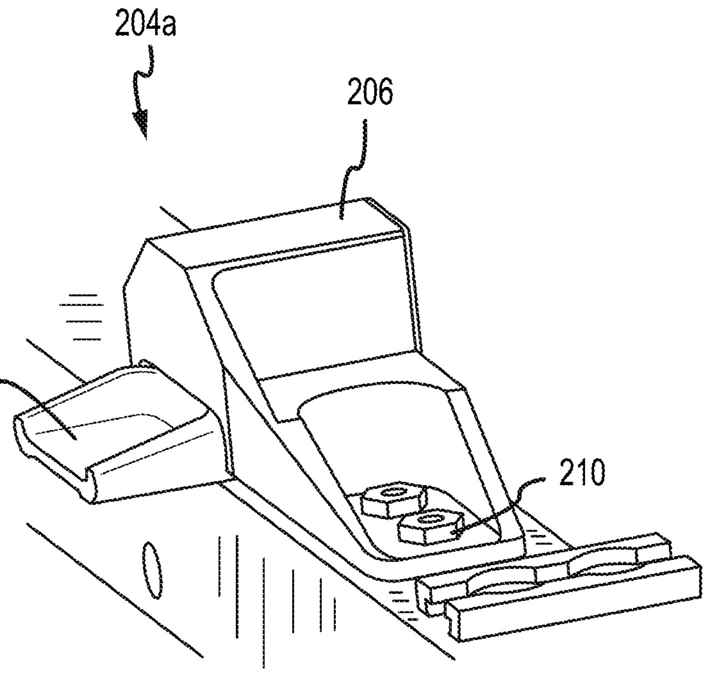
Figure 2C:
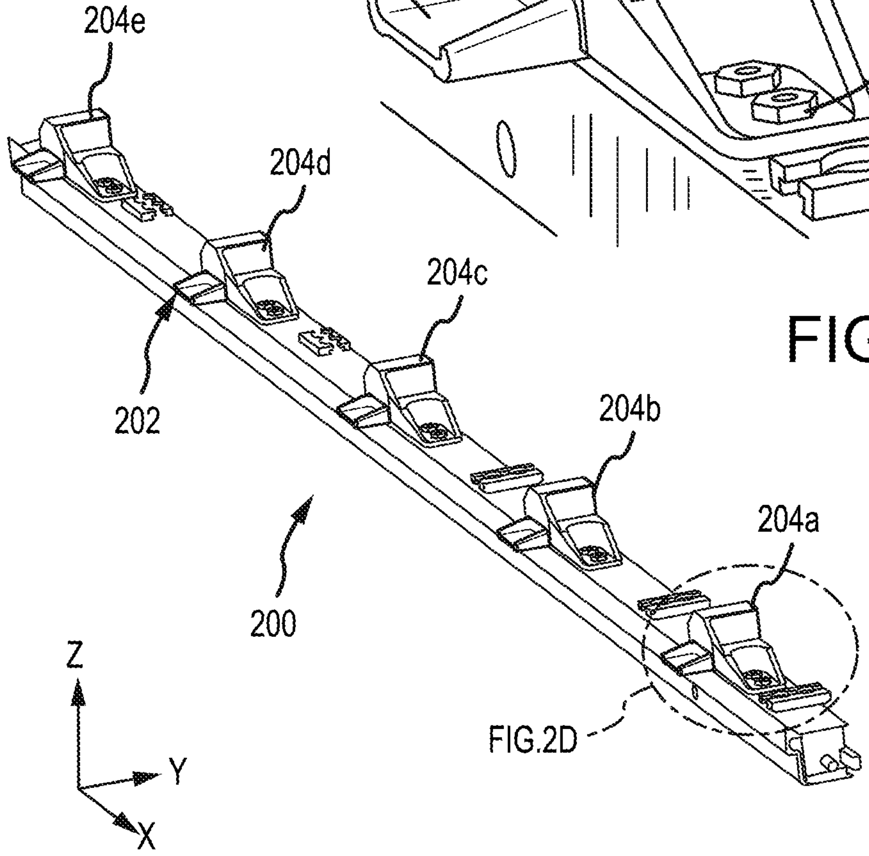

Referring now to FIGS. 2A-2D, a cargo handling system 200 for use in an aircraft (e.g., aircraft 10) is illustrated, in accordance with various embodiments. Cargo handling system 200 includes a rail 202, a first side-lock subassembly 204*a*, a second side-lock subassembly 204*b*, a third side-lock subassembly 204*c*, a fourth side-lock subassembly 204*d*, and a fifth side-lock subassembly 204*c* that may be collectively referred to as a plurality of side-lock subassemblies 204. FIG. 2A is a perspective view of rail 202 including the plurality of side-lock subassemblies 204 in a retracted position. FIG. 2B is a perspective view of first side-lock subassembly 204*a* in the retracted position. FIG. 2C is a perspective view of rail 202 including the plurality of side-lock subassemblies 204 in an extended position. FIG. 2D is a perspective view of first side-lock subassembly 204*a* in the extended position.

Rail 202 may be secured to the aircraft and extend in a longitudinal direction (e.g., parallel to the x-axis) of the aircraft. Side-lock subassembly 204 includes a base 206 and a slider lock 208. Slider lock 208 is configured to extend from base 206 (e.g., in the negative y-direction) into the extended position. Slider lock 208 is further configured to retract into base 206 (e.g., in the positive y-direction) into the retracted position. In various embodiments, slide-lock subassembly 204 may be secured to rail 202 by one or more bolts 210.

Figure 3:
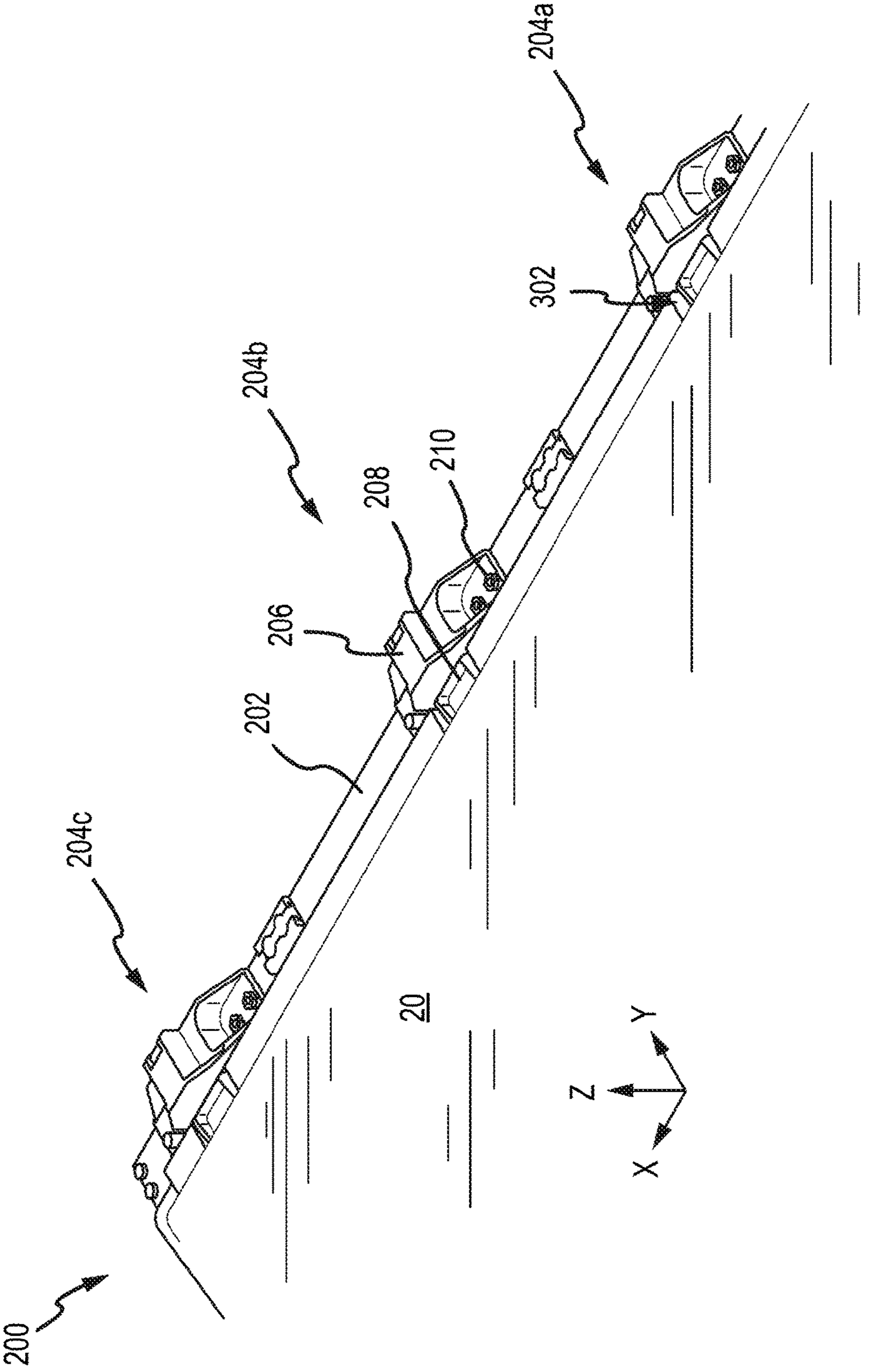
FIG. 3 illustrates a cargo handling system including side-lock subassemblies securing cargo, in accordance with various embodiments.

Referring now to FIG. 3, a perspective view of cargo handling system 200 including a unit load device (ULD) (e.g., ULD 20) in a secured position is illustrated, in accordance with various embodiments. ULD 20 includes multiple slots 302 along an outer edge of ULD 20. Slots 302 may be rectangular and sized to receive slider lock 208 of side-lock subassembly 204. As illustrated, the plurality of side-lock assemblies 204 is in the engaged position with slider locks 208 extend (e.g., in the negative y-direction) into slots 302 of ULD 20. In the extended position, the plurality of side-lock subassemblies 204 may prevent movement of ULD 20 in a vertical direction (e.g., in the positive z-direction) or in a longitudinal direction (e.g., along the x-axis).

Figure 4B:
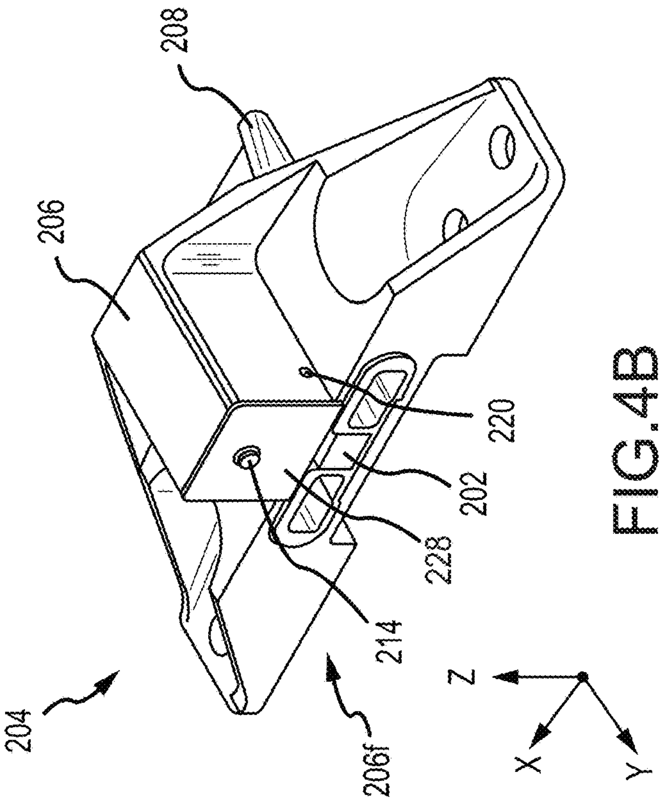
FIGS. 4A, 4B, 4C, 4D, 4E, 4F, 4G, 4H, and 4I illustrate a fully automatic side-lock subassembly, in accordance with various embodiments.
Figure 4A:
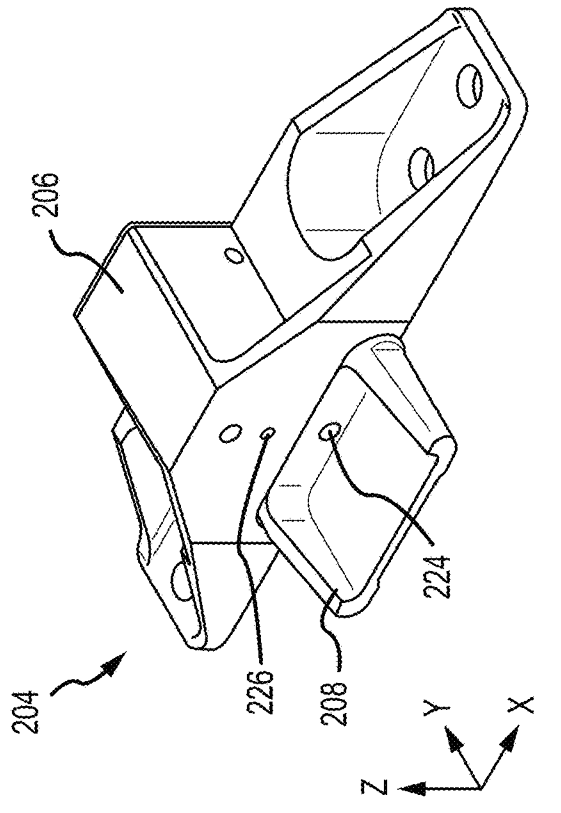
Figure 4D:
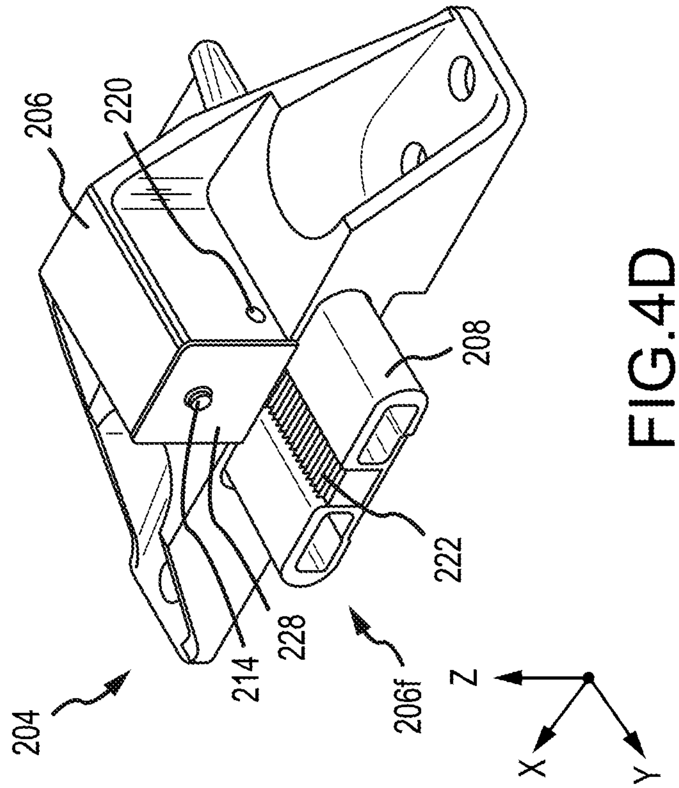
Figure 4C:
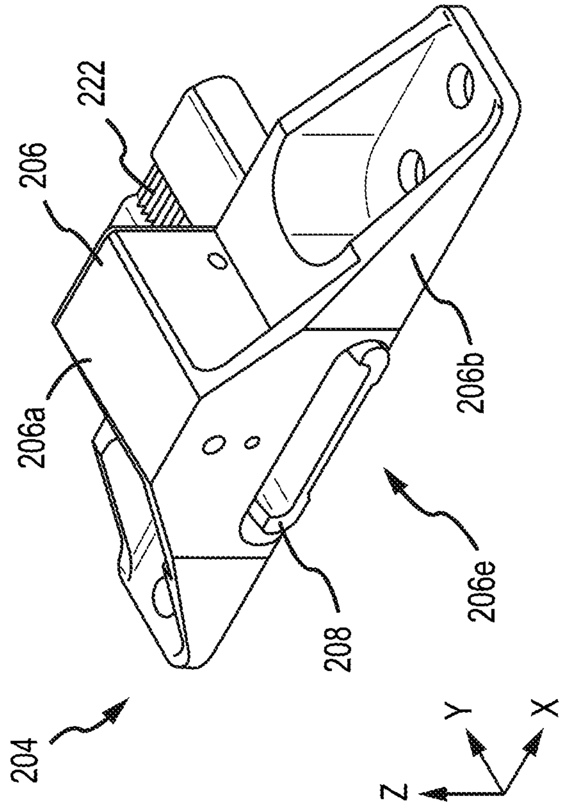
Figure 4F:
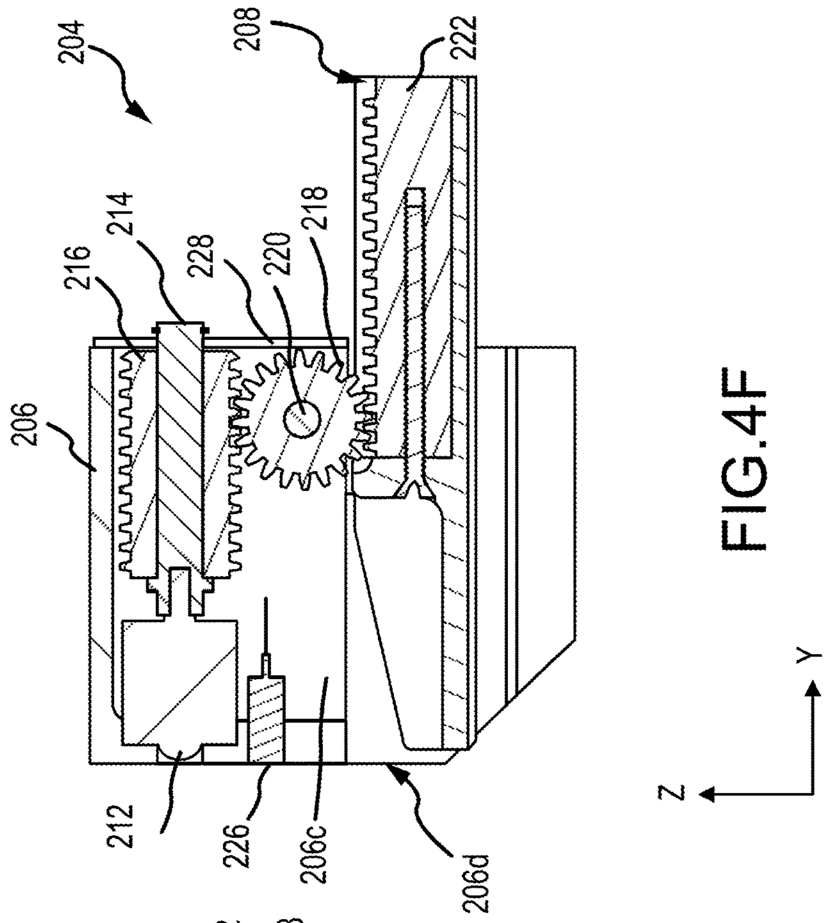
Figure 4E:
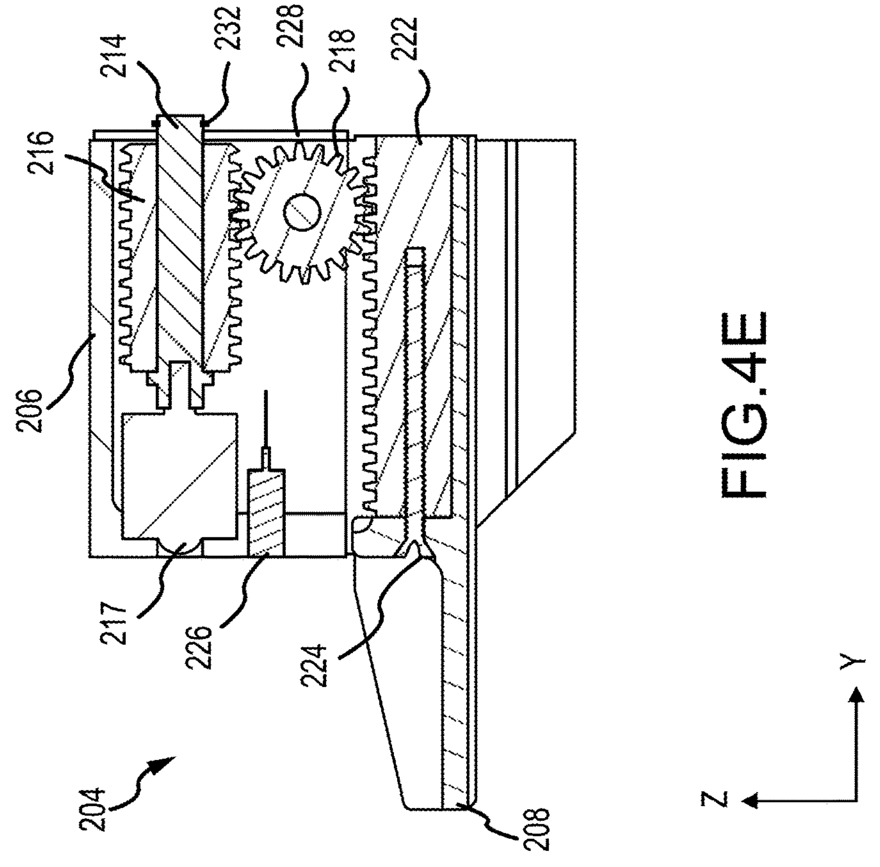
Figure 4H:
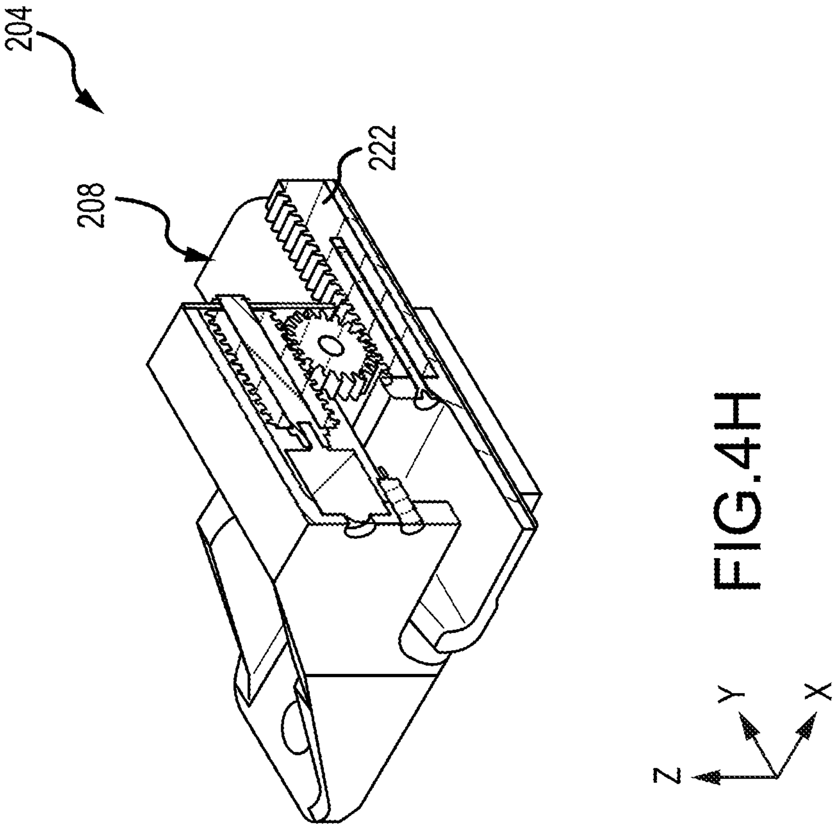
Figure 4G:
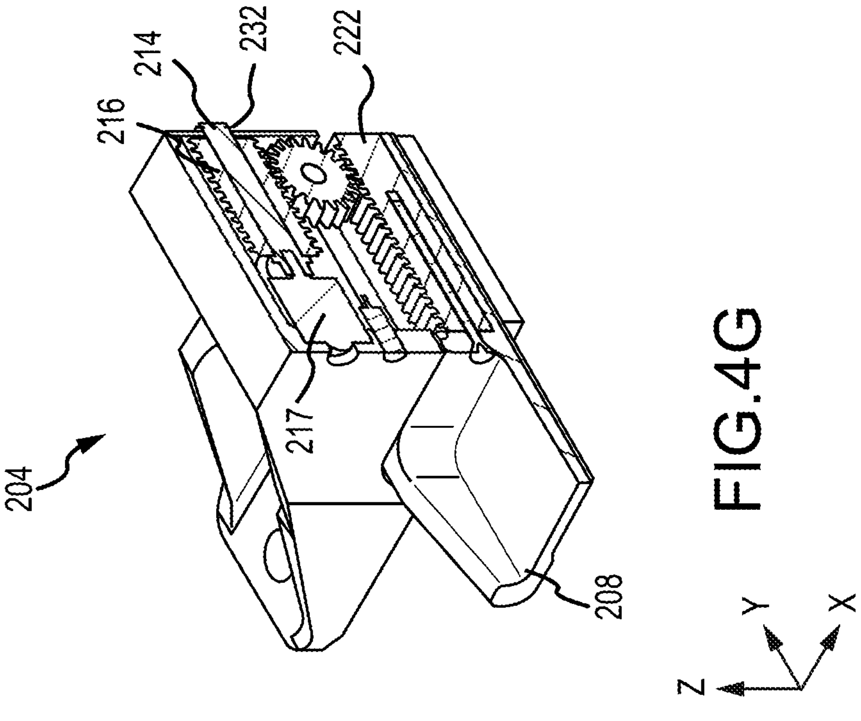
Figure 4I:
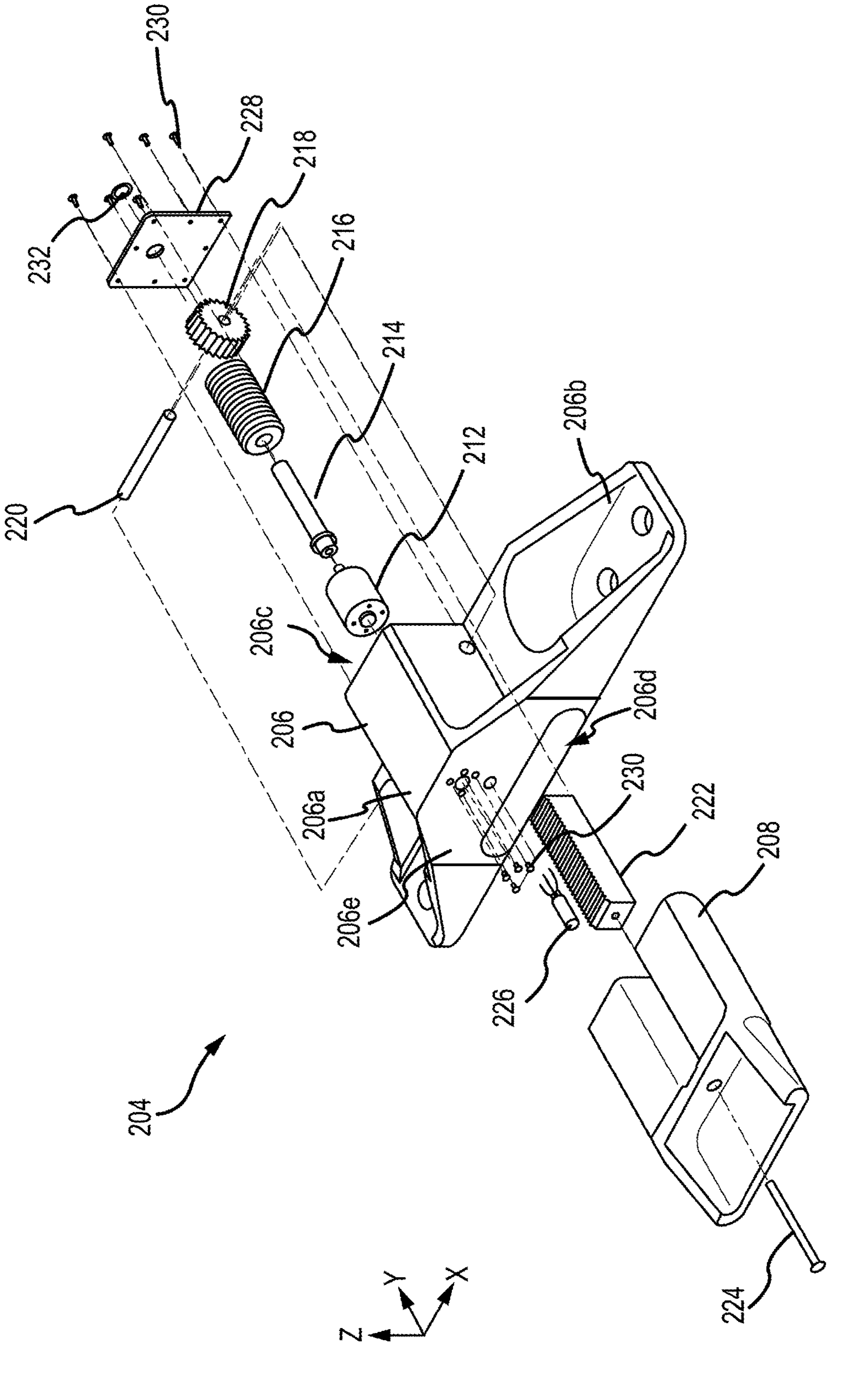

Referring now to FIGS. 4A-4I, a side-lock subassembly 204 of the plurality of side-lock subassemblies 204 (e.g., first side-lock subassembly 204*a*) is illustrated in accordance with various embodiments. FIG. 4A is a front isometric view of side-lock subassembly 204 in the engaged position and FIG. 4B is a back isometric view of side-lock subassembly 204 in the engaged position. FIG. 4C is a front isometric view of side-lock subassembly 204 in the retracted position and FIG. 4D is a back isometric view of side-lock subassembly 204 in the retracted position. FIG. 4E is a cross section view of side-lock subassembly 204 in the engaged position and FIG. 4F is a cross section view of side-lock subassembly 204 in the retracted position. FIG. 4G is a front isometric cross section view of side-lock subassembly 204 in the engaged position and FIG. 4H is a back isometric cross section view of side-lock subassembly 204 in the retracted position. FIG. 4I is a front isometric exploded view of the various components of side-lock subassembly 204.

Side-lock subassembly 204 includes base 206, slider lock 208, a motor 212, a coupler shaft 214, a worm 216, a worm gear 218, a dowel pin 220, a rack 222, a head screw 224, a proximity sensor 226, an enclosure cap 228, a plurality of screws 230, and a retainer ring 232. base 206 includes an upper portion 206*a* (e.g., in the positive z-direction), a lower portion 206*b* (e.g., in the negative z-direction), an upper cavity 206*c*, a lower cavity 206*d*, a front 2060 (e.g., in the negative y-direction), and a back 206*f* (e.g., in the positive y-direction). In the illustrated embodiments, upper cavity 206*c* and lower cavity 206*d* are a single cavity, though the distinction of upper cavity 206*c* and lower cavity 206*d* will be used for ease of description. In various embodiments, upper cavity 206*c* and lower cavity 206*d* may be separate and distinct cavities that are separated by a partition. Lower portion 206*b* includes one or more holes formed therein to receive bolts 210 to secure side-lock subassembly 204 to rail 202. Enclosure cap 228 is secured to back 206*f* of base 206 by one or more screws 230, thereby enclosing upper cavity 206*c*.

Motor 212 is disposed in upper cavity 206*c* and secured to front 206*e* of base 206 by one or more screws 230. Motor 212 includes a shaft that extends toward back 206*f* (e.g., in the positive y-direction) that is coupled to coupler shaft 214. Coupler shaft 214 is coupled to worm 216 that is threaded. In various embodiments, coupler shaft 214 extends through worm 216. In various embodiments, coupler shaft 214 is integral to worm 216, forming a single, monolithic component. Motor 212 is configured to rotate coupler shaft 214 along an axis (e.g., parallel to the y-axis) that then rotates worm 216. Coupler shaft 214 extends through enclosure cap 228 and is secured by retainer ring 232 disposed opposite enclosure cap 228 of upper cavity 206*c*.

Slider lock 208 is configured to receive rack 222 and be coupled to rack 222. Rack 222 includes teeth disposed along a top surface (e.g., in the positive z-direction). In various embodiments, slider lock 208 includes a cavity to receive rack 222. In various embodiments, rack 222 is coupled to slider lock 208 by head screw 224. In various embodiments, rack 222 may be integral to slider lock 208, forming a single, monolithic component. Sliding lock 208 and rack 222 are configured to slide through lower cavity 206*d* of base 206. Body includes openings in front 206*e* and back 206*f* that allow sliding lock 208 to extend through base 206.

Worm gear 218 includes teeth that are configured to engage the threading of worm 216 and the teeth of rack 222. Worm gear 218 is disposed within upper cavity 206*c* between worm 216 and rack 222, with worm 216 being above (e.g., in the positive z-direction) worm gear 218 and rack 222 being below (e.g., in the negative z-direction) worm gear 218. Worm gear 218 is coupled to base 206 by dowel pin 220 that extends perpendicular to the axis of rotation of worm 216 (e.g., parallel to the x-axis). In various embodiments, dowel pin 220 extends through base 206. Worm gear 218 rotates about the x-axis in response to worm 216 rotating about the y-axis and rack 222 moves along the y-axis in response to worm gear 218 rotating about the x-axis.

In various embodiments, motor 212 is configured to rotate in a clockwise direction and a counterclockwise direction to engage and retract slider lock 208. In various embodiments, to engage slider lock 208 motor 212 rotates coupler shaft 214 in a first direction (e.g., the clockwise direction about the y-axis), causing worm 216 to rotate in the first direction, causing worm gear 218 to rotate in a second direction (e.g., the clockwise direction about the x-axis), which causes rack 222 and slider lock 208 to move in a third direction (e.g., in the negative y-direction). In various embodiments, to retract slider lock 208 motor 212 rotates coupler shaft 214 in a fourth direction (e.g., the counterclockwise direction about the y-axis), causing worm 216 to rotate in the fourth direction, causing worm gear 218 to rotate in a fifth direction (e.g., the counterclockwise direction about the x-axis), which causes rack 222 and slider lock 208 to move in a six direction (e.g., in the positive y-direction). In various embodiments, motor 212 may be controlled to partially extend or partially retract slider lock 208.

Accordingly, motor 212 controls the extension and retraction of slider lock 208. It is important to note that this configuration prevents slider lock 208 from causing the rotation of worm gear 218, worm 216, coupler shaft 214, and/or motor 212. That is, slider lock 208 may not be manually retracted (e.g., by pushing/pulling in the positive y-direction) or extended (e.g., by pushing/pulling in the negative y-direction). Therefore, side-lock subassembly 204 works as a lock preventing movement of the cargo (e.g., ULD 20) in the positive z-direction and along the x-axis.

Proximity sensor 226 is coupled to base 206, and more specifically, through an opening in front 206*e* of base 206. Proximity sensor 226 is configured to provide the proximity, or distance, to the cargo (e.g., ULD 20), and more specifically, to slots (e.g., slots 302) in the cargo. In various embodiments, proximity sensor 226 may be coupled to a central controller for cargo handling system 200. In various embodiments, proximity sensor 226 may be an infrared (IR) sensor, an ultrasonic sensor, an inductive sensor, a capacitive sensor, an optic sensor, an optical sensor, among others. In various embodiments, proximity sensor 226 may include more than one sensor and/or more than one type of sensor.

Figure 5:
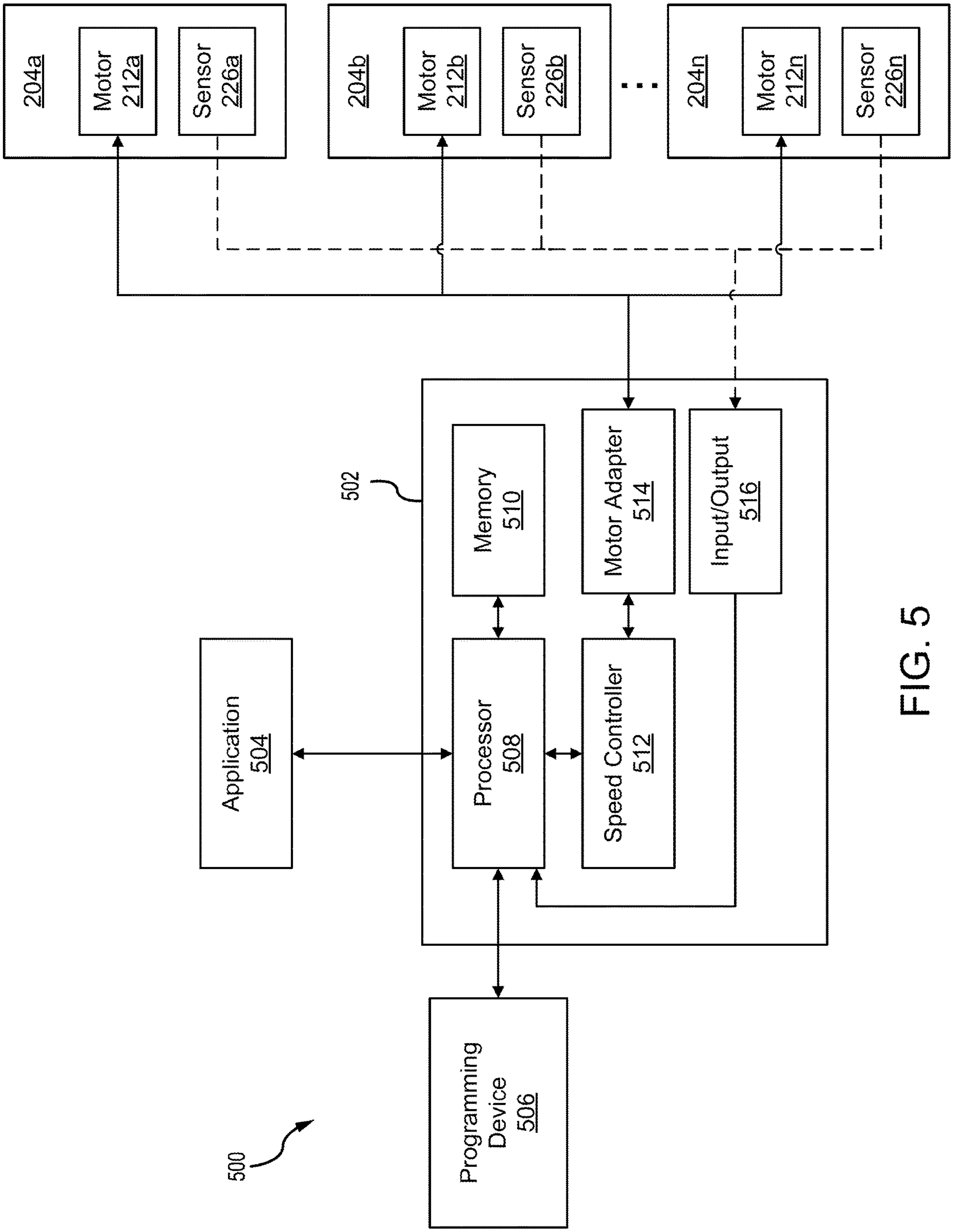
FIG. 5 illustrates a system for controlling a fully automatic side-lock subassembly, in accordance with various embodiments.

Referring now to FIG. 5, a system 500 for controlling a cargo handling system (e.g., cargo handling system 200) including a plurality of side-lock subassemblies 204. System 500 includes a controller 502, an application 504, a programming device 506 (e.g., computer, programmer hardware, etc.), and a plurality of side-lock subassemblies 204*a*, 204*b*, . . . , 204*n*, each including motor 212 and proximity sensor 226. In various embodiments, application 504 may be used by an operator to control one or more of the plurality of side-lock subassemblies 204. In various embodiments, application 504 may be used by another application to control one or more of the plurality of side-lock subassemblies 204. Programming device 506 may be used to program and configure controller 502 to operate each of the plurality of side-lock subassemblies 204 either individually or collectively. In various embodiments, each of the plurality of side-lock subassemblies 204 may be configured differently, such as for example, different sized motors, different gear ratios, among others.

Controller 502 may include a processor 508, a memory 510, a speed controller 512, a motor adapter 514, and an input/output (I/O) device 516. Processor 508 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 510 may comprise memory to store data, executable instructions, system program instructions, and/or controller instructions to implement the control logic of controller 502, and more specifically, processor 508.

Speed controller 512 may receive instructions from processor 508 to control the operating speed of motor 212 and/or operating time of motor 212. The operating speed may be controlled by varying the voltage and/or current applied to motor 212. In various embodiments, speed controller 512 may be programed, via processor 508, by programming device 506. In various embodiments, speed controller 512 may be controlled by processor 508. In various embodiments speed controller 512 may further control an extension length of slider lock 208 of each of the plurality of side-lock subassemblies 204.

Motor adapter 514 may be used to control motor 212, in accordance with various embodiments. In various embodiments, motor adapter 514 may include programming and/or encoding used to communicate control information to motor 212. Examples of control information include number of rotations, speed information, or feedback from motor 212, among others. Motor adapter 514 may then communicate back to processor 508 an extension and/or retraction distance of slider lock 208 of each of the plurality of side-lock subassemblies 204.

I/O device 516 is configured to receive proximity data from each of the plurality of side-lock subassemblies 204 and send the information to processor 508 for processing. Processor 508 may determine to extend and/or retract one or all slider locks 208 of the plurality of side-lock subassemblies 204 in response to information received from each of the proximity sensors 226. This allows system 500 including the plurality of side-lock subassemblies 204 to be fully autonomous and engage the cargo (e.g., ULD 20) without user intervention.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 6A:
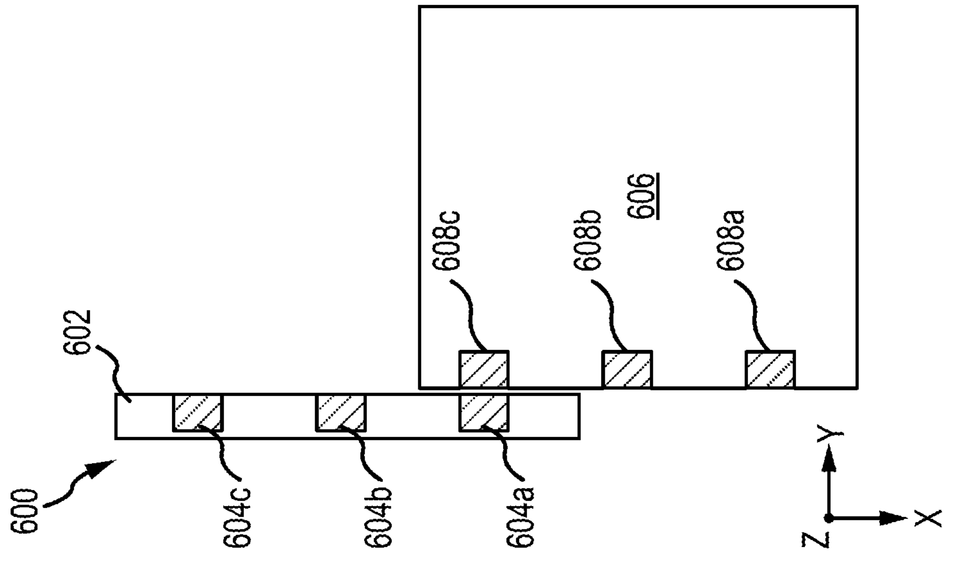
FIGS. 6A, 6B, and 6C illustrate the operation of a cargo handling system including fully automatic side-lock subassemblies, in accordance with various embodiments.
Figure 6B:
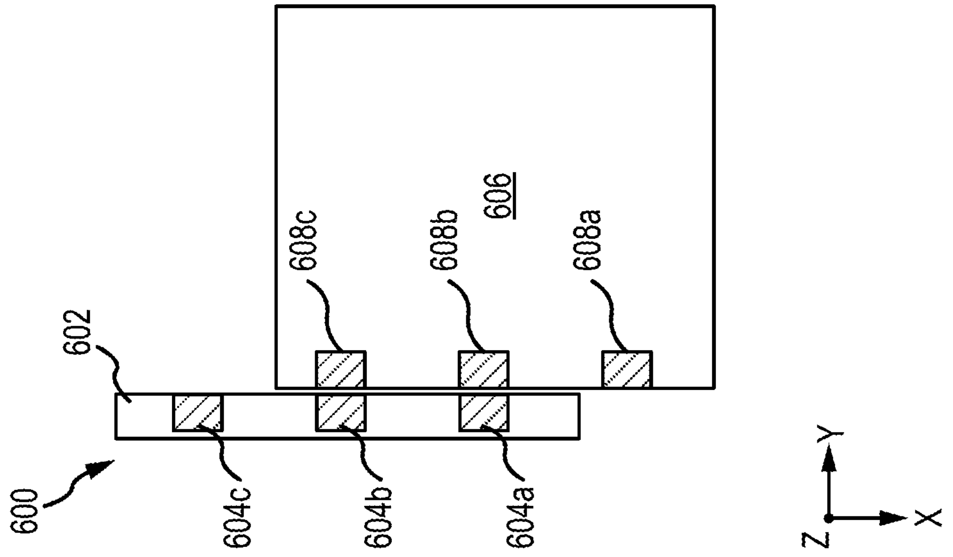
Figure 6C:
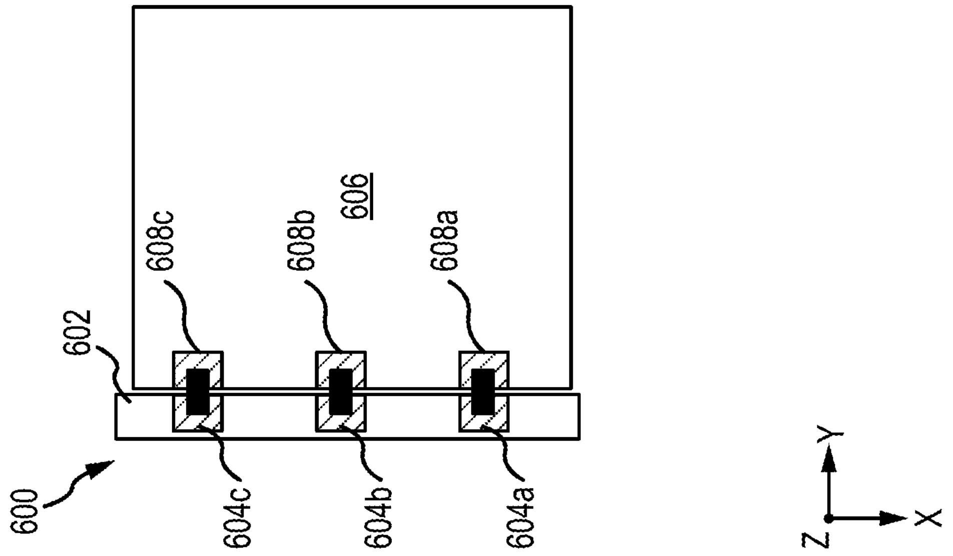

Referring now to FIG. 6A-6C, a cargo handling system 600 is illustrated, in accordance with various embodiments. In various embodiments, cargo handling system 600 may be an example of cargo handling system 200 described above in FIGS. 2A-2D being controlled by system 500 described above in FIG. 5. Cargo handling system 600 includes a tray 602, a first side-lock subassembly 604*a*, a second side-lock subassembly 604*b*, a third side-lock subassembly 604*c*, and a unit load device (ULD) 606 including a first slot 608*a*, a second slot 608*b*, and a third slot 608*c*. Side-lock subassemblies 604*a*, 604*b*, 604*c* may be examples of side-lock subassembly 204 described above in FIGS. 2A-21, ULD 606 may be an example of ULD 20 described above in FIG. 1, and slots 608*a*, 608*b*, 608*c* may be examples of slots 302 described above in FIG. 3.

Referring first to FIG. 6A, side-lock subassemblies 604*a*, 604*b*, 604*c* are in a retracted state allowing ULD 606 to move into a storage position (e.g., in the negative x-direction). As ULD 606 moves into position, a proximity sensor of first side-lock subassembly 604*a* sends a signal to controller 502 indicating that first side-lock subassembly 604*a* is aligned with a slot of ULD 606 (i.e., third slot 608*c*). A proximity sensor of second side-lock subassembly 604*b* sends a signal to controller 502 indicating that second side-lock subassembly 604*b* is not aligned with a slot of ULD 606. A proximity sensor of third side-lock subassembly 604*c* sends a signal to controller 502 indicating that third side-lock subassembly 604*c* is not aligned with a slot of ULD 606. Controller 502 may determine to maintain side-lock subassemblies 604*a*, 604*b*, 604*c* in the retracted state in response to the signals received.

Referring next to FIG. 6B, side-lock subassemblies 604*a*, 604*b*, 604*c* remain in the retracted state allowing ULD 606 to move into the storage position (e.g., in the negative x-direction). The proximity sensor of first side-lock subassembly 604*a* sends a signal to controller 502 indicating that first side-lock subassembly 604*a* is aligned with a slot of ULD 606 (i.e., second slot 608*b*). The proximity sensor of second side-lock subassembly 604*b* sends a signal to controller 502 indicating that second side-lock subassembly 604*b* is aligned with a slot of ULD 606 (i.e., third slot 608*c*). The proximity sensor of third side-lock subassembly 604*c* sends a signal to controller 502 indicating that third side-lock subassembly 604*c* is not aligned with a slot of ULD 606. Controller 502 may determine to maintain side-lock subassemblies 604*a*, 604*b*, 604*c* in the retracted state in response to the signals received.

Referring next to FIG. 6C, side-lock subassemblies 604*a*, 604*b*, 604*c* move into an engaged state in response to ULD 606 arriving at the storage position (e.g., in the negative x-direction). The proximity sensor of first side-lock subassembly 604*a* sends a signal to controller 502 indicating that first side-lock subassembly 604*a* is aligned with a slot of ULD 606 (i.e., first slot 608*a*). The proximity sensor of second side-lock subassembly 604*b* sends a signal to controller 502 indicating that second side-lock subassembly 604*b* is aligned with a slot of ULD 606 (i.e., second slot 608*b*). The proximity sensor of third side-lock subassembly 604*c* sends a signal to controller 502 indicating that third side-lock subassembly 604*c* is aligned with a slot of ULD 606 (i.e., third slot 608*c*). Controller 502 may determine to move side-lock subassemblies 604*a*, 604*b*, 604*c* to the engaged state in response to the signals received.

Fully autonomous operation of the plurality of side-lock subassemblies 604 is enabled by including a motor and a proximity sensor in each of the plurality of side-lock subassemblies 604. Additionally, or in the alternative, a user may intervene and operate one or more of the plurality of side-lock subassemblies 604 depending on the use case. Similarly, controller 502 may move side-lock subassemblies 604*a*, 604*b*, 604*c* to the retracted state to allow ULD 606 to be unloaded from cargo handling system 600.

Figure 7:
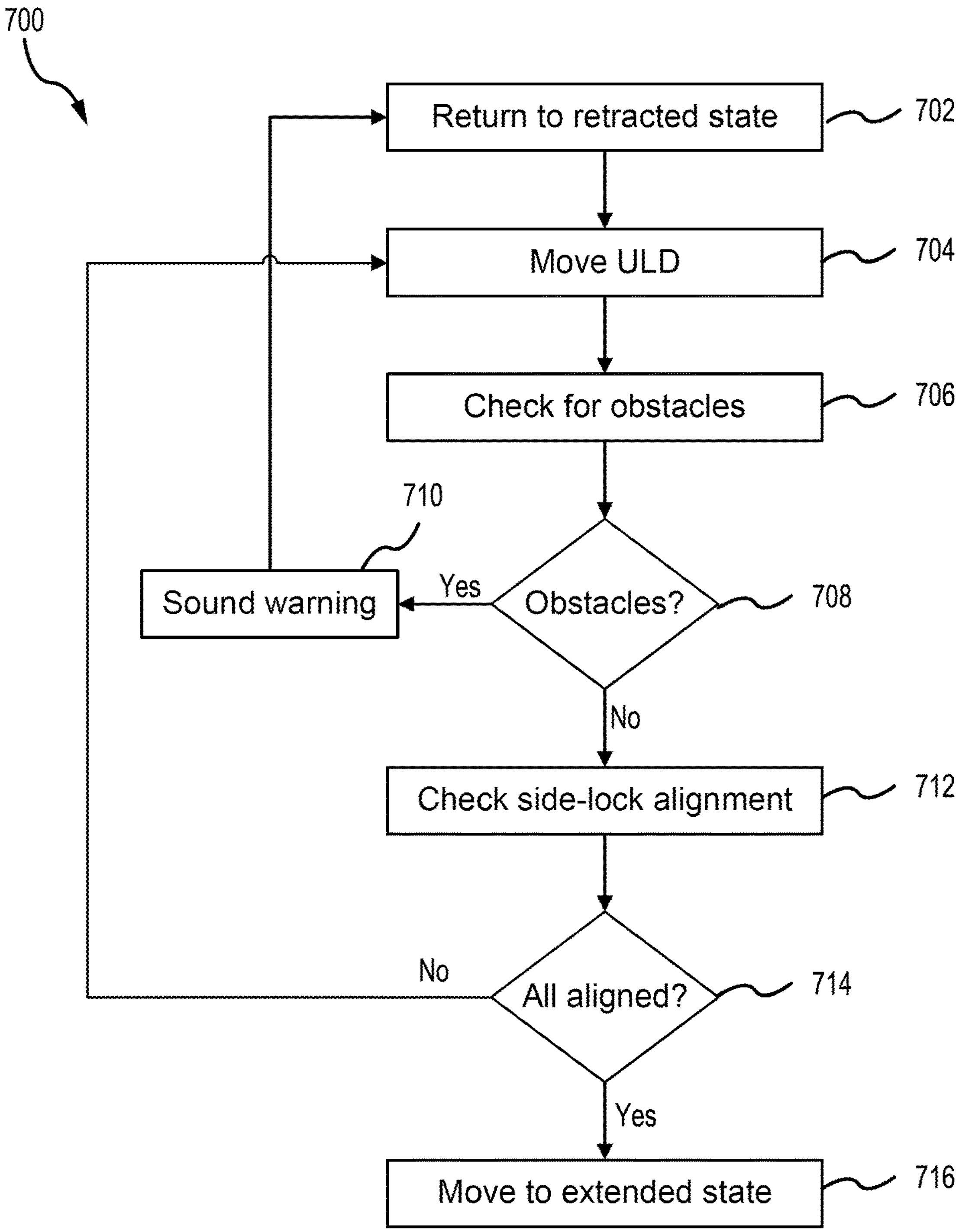
FIG. 7 illustrates a method of controlling a cargo handling system including fully automatic side-lock subassemblies, in accordance with various embodiments.

Referring now to FIG. 7, a method 700 for controlling the plurality of side-lock subassemblies 204 within a cargo handling system is illustrated, in accordance with various embodiments. Method 700 may be executed by a controller, such as for example, controller 502 described above in FIG. 5.

At block 702, controller 502 returns the plurality of side-lock subassemblies 204 to the retracted position in preparation to receive ULD 20. At block 704, controller 502 moves ULD 20 within cargo handling system and into position within the aircraft. At block 706, controller 502 checks for obstacles that prevent movement of ULD 20. In various embodiments, this may include receiving proximity data from each of the plurality of side-lock subassemblies 204. In various embodiments, this may include receiving information from other subassemblies within the cargo handling system (e.g., cargo handling system 200). At decision block 708, controller 502 determines whether any obstacles exist. If it is determined that an obstacle exists, method 700 proceeds to block 710. At block 710, controller 502 sounds a warning alerting personnel of the obstacle and returns to block 702 to ensure that the plurality of side-lock subassemblies 204 are in the retracted state.

Returning to decision block 708, if instead it is determined that there are no obstacles, method 700 proceeds to block 712. At block 712, controller 502 receives data from each of the plurality of side-lock subassemblies 204. This may be similar to the description above of FIG. 6. Each of the plurality of side-lock subassemblies 204 may provide proximity data to controller 502 indicating whether or not a slot of ULD 20 is adjacent the side-lock assembly 204. At decision block 714, controller 502 determines whether ULD 20 is aligned with the plurality of side-lock subassemblies 204. If it is determined that ULD 20 is not aligned, then method 700 proceeds to block 704 to move ULD into position. If instead, it is determined that ULD 20 is aligned, then method 700 proceeds to block 716. At block 716, controller 502 instructs each of the plurality of side-lock subassemblies 204 to move the extended state, securing ULD 20 in place.

It should be understood, that while method 700 describes a single ULD, there may be many ULDs that are loaded by the cargo handling system. Therefore, method 700 may be applied to each subset of the plurality of side-lock subassemblies 204 that are positioned to engage each ULD as it is moved into place. In various embodiments, all ULDs may be moved into place before engaging any of the plurality of side-lock subassemblies 204. In various embodiments, controller 502 may provide an indication that ULD 20 is in the storage position and wait for a user input prior to moving the plurality of side-lock subassemblies 204 to the extended sate. In various embodiments, controller 502 may return the plurality of side-lock subassemblies 204 to the retracted position in preparation to unload ULD 20 from aircraft 10.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A side-lock subassembly, including:

a base defining a cavity and including an opening that extends through a first side and an opposing second side of the base;

a slider lock configured to extend out the opening of the first side in a first direction in an engaged position and out the second side in a second direction in a retracted position, the second direction being 180 degrees from the first direction; and a motor configured to move the slider lock in the first direction and in the second direction, the motor disposed within the cavity;

a worm coupled to the motor;

a rack coupled to a cavity extending into a planar face of the slider lock;

a worm gear coupled to the base, the worm gear coupled to the worm and the rack and configured to translate a rotational motion of the worm to a linear motion of the slider lock;

a coupler shaft having a first end and a second end, the first end coupled to the motor and the second end coupled to the worm;

a dowel pin extending through the worm gear and securing the worm gear to the base;

an enclosure cap coupled to the base and enclosing the cavity, the enclosure cap including a second opening, wherein the second end of the coupler shaft extends through the second opening; and a retainer ring configured to secure the second end of the coupler shaft to the enclosure cap.

2. The side-lock subassembly of claim 1, further including:

a screw securing the rack to the slider lock.

3. The side-lock subassembly of claim 1, further including:

a proximity sensor coupled to the base and pointing in the first direction.

4. The side-lock subassembly of claim 1, wherein the slider lock moves in the first direction in response to the motor turning in a clockwise direction and the slider lock moves in the second direction in response to the motor turning in a counterclockwise direction.

5. A cargo handling system, including:

a rail; and a side-lock subassembly coupled to the rail, the side-lock subassembly including:

a base defining a cavity and including an opening that extends through the base;

a slider lock fixedly coupled to a rack and configured to extend out from the opening of the base in a first direction;

a motor configured to engage the rack to move the slider lock in the first direction and in a second direction that is 180 degrees opposite the first direction, the motor disposed within the cavity;

a worm coupled to the motor; and a worm gear coupled to the base, the worm gear coupled to the worm and the rack and configured to translate a rotational motion of the worm to a linear motion of the slider lock, and wherein the rack is disposed within a cavity extending into a planar face of the slider lock.

6. The cargo handling system of claim 5, the side-lock subassembly further including:

a coupler shaft having a first end and a second end, the first end coupled to the motor and the second end coupled to the worm; and a dowel pin extending through the worm gear and securing the worm gear to the base.

7. The cargo handling system of claim 6, the side-lock subassembly further including:

an enclosure cap coupled to the base and enclosing the cavity, the enclosure cap including an opening, wherein the second end of the coupler shaft extends through the opening; and a retainer ring configured to secure the second end of the coupler shaft to the enclosure cap.

8. The cargo handling system of claim 5, the side-lock subassembly further including:

a screw securing the rack to the slider lock.

9. The cargo handling system of claim 5, the side-lock subassembly further including:

a proximity sensor coupled to the base and pointing in the first direction.

10. The cargo handling system of claim 5, wherein the slider lock moves in the first direction in response to the motor turning in a clockwise direction and the slider lock moves in the second direction in response to the motor turning in a counterclockwise direction.

* * * * *